US005651751A

United States Patent [19]
Jang

[11] Patent Number: 5,651,751
[45] Date of Patent: Jul. 29, 1997

[54] SHIFT CONTROL SYSTEM OF AN AUTOMATIC TRANSMISSION USED IN A VEHICLE

[75] Inventor: Jaeduk Jang, Kyungki-do, Rep. of Korea

[73] Assignee: Hyundai Motor Company, Rep. of Korea

[21] Appl. No.: 554,378

[22] Filed: Nov. 8, 1995

[30] Foreign Application Priority Data

Nov. 9, 1994 [KR] Rep. of Korea .................. 94-29316

[51] Int. Cl.⁶ .................................................. F16H 61/00
[52] U.S. Cl. ........................... 477/117; 74/335; 477/131
[58] Field of Search .................................. 477/116, 117, 477/130, 131; 192/87.1, 87.11, 87.13, 87.14, 103 F; 74/335

[56] References Cited

U.S. PATENT DOCUMENTS

| | | | |
|---|---|---|---|
| 4,957,015 | 9/1990 | Ishikawa et al. | 477/116 X |
| 5,364,317 | 11/1994 | Amemiya | 477/116 X |
| 5,472,389 | 12/1995 | Ando et al. | 477/130 |
| 5,501,645 | 3/1996 | Taniguchi et al. | 477/130 |
| 5,507,706 | 4/1996 | Jang et al. | 477/131 X |
| 5,527,236 | 6/1996 | Kimura et al. | 477/131 |

Primary Examiner—Charles A. Marmor
Assistant Examiner—Saul Rodriguez
Attorney, Agent, or Firm—Finnegan, Henderson, Farabow, Garrett & Dunner, L.L.P.

[57] ABSTRACT

Disclosed is a shift control system of an automatic transmission used in a vehicle, which includes an oil pump, a line pressure regulator for regulating the hydraulic pressure supplied from an oil pump to the hydraulic control line, a reducing valve for forming a pressure lower than the line pressure, a first to fourth pressure control valves respectively having a first and a second port for receiving a control pressure from the reducing valve, a third port for receiving the line pressure, fourth port for delivering the line pressure to shift valves, wherein there are provided an N-D control valve, a second-to-third shift valve, a third-to-fourth shift valve, a fourth-to-fifth shift valve, and a reverse drive clutch valve to selectively deliver the pressure from the pressure control valves to the first to fifth friction elements and reverse drive friction element.

5 Claims, 9 Drawing Sheets

SHIFT CONTROL SYSTEM OF AN AUTOMATIC TRANSMISSION USED IN A VEHICLE

BACKGROUND OF THE INVENTION (1) Field of the Invention

The present invention concerns a shift control system of an automatic transmission for a vehicle, and more particularly a shift control system of an automatic transmission for a vehicle, which employs a lay shaft to constitute a power train with three shafts and five speeds.

(2) Description of Prior Art

The automatic transmission carries out a gearshift by means of a transmission control unit (TCU), which controls solenoid valves to regulate the hydraulic pressure flow according to the vehicle speed or the degree of the acceleration pedal being pressed down. It also employs the hydraulic pressure to control the clutches for associating rotational members, and friction elements such as brakes for fixing the rotational elements to change the ratio of the gearshift of a planetary gear system. This is achieved by selecting the input elements for receiving the engine power and the reaction element, which selection is accomplished by the shift control system. Generally, the shift control may be complicated or not according to the procedure to control the friction elements.

SUMMARY OF THE INVENTION

An object of the present invention is to provide a shift control system with a means to facilitate the shift control used in an automatic transmission, which employs a lay shaft constituting a power train with three shafts and five speeds.

Another object of the present invention is to provide a shift control system with means for reducing the number of the solenoid valves at least by one and means for making it possible to independently control the friction elements.

According to an embodiment of the present invention, a shift control system of an automatic transmission used in a vehicle comprises an oil pump, a line pressure regulator for regulating the hydraulic pressure supplied from an oil pump to the hydraulic control line, a reducing valve for forming a pressure lower than the line pressure, a first to fourth pressure control valves respectively having a first and a second port for receiving a control pressure from the reducing valve, a third port for receiving the line pressure, fourth port for delivering the line pressure to shift valves, wherein there are provided an N-D control valve, a second-to-third shift valve, a third-to-fourth shift valve, a fourth-to-fifth shift valve, and a reverse drive clutch valve to selectively deliver the pressure from the pressure control valves to the first to fifth friction elements and reverse drive friction element.

The present invention will now be described with reference to the drawings attached only by way of example.

DETAILED DESCRIPTION of PREFERRED EMBODIMENTS

Figure 1:
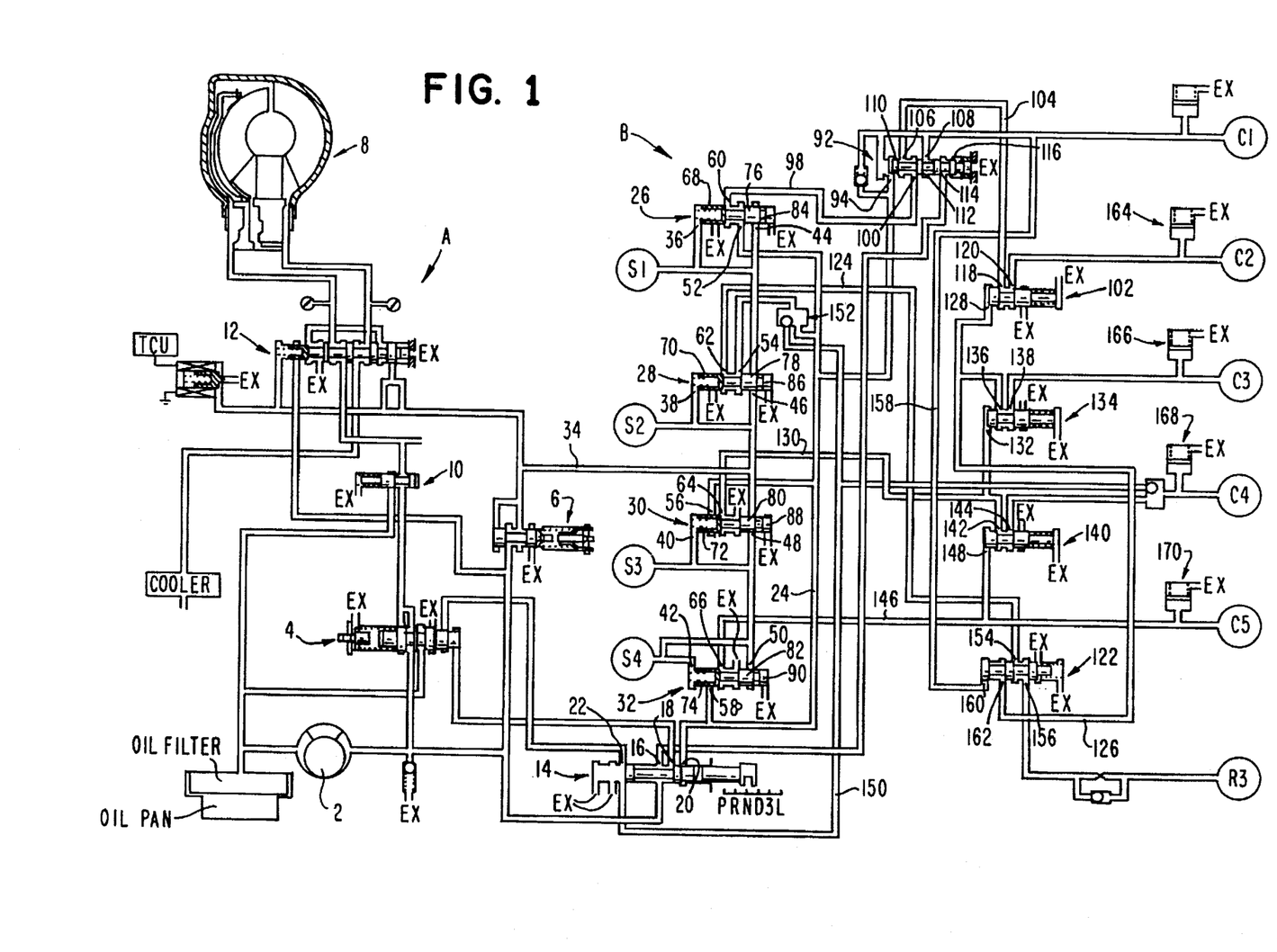
FIG. 1 is a schematic diagram for illustrating a hydraulic line of a shift control system according to an embodiment of the present invention.
Figure 2:
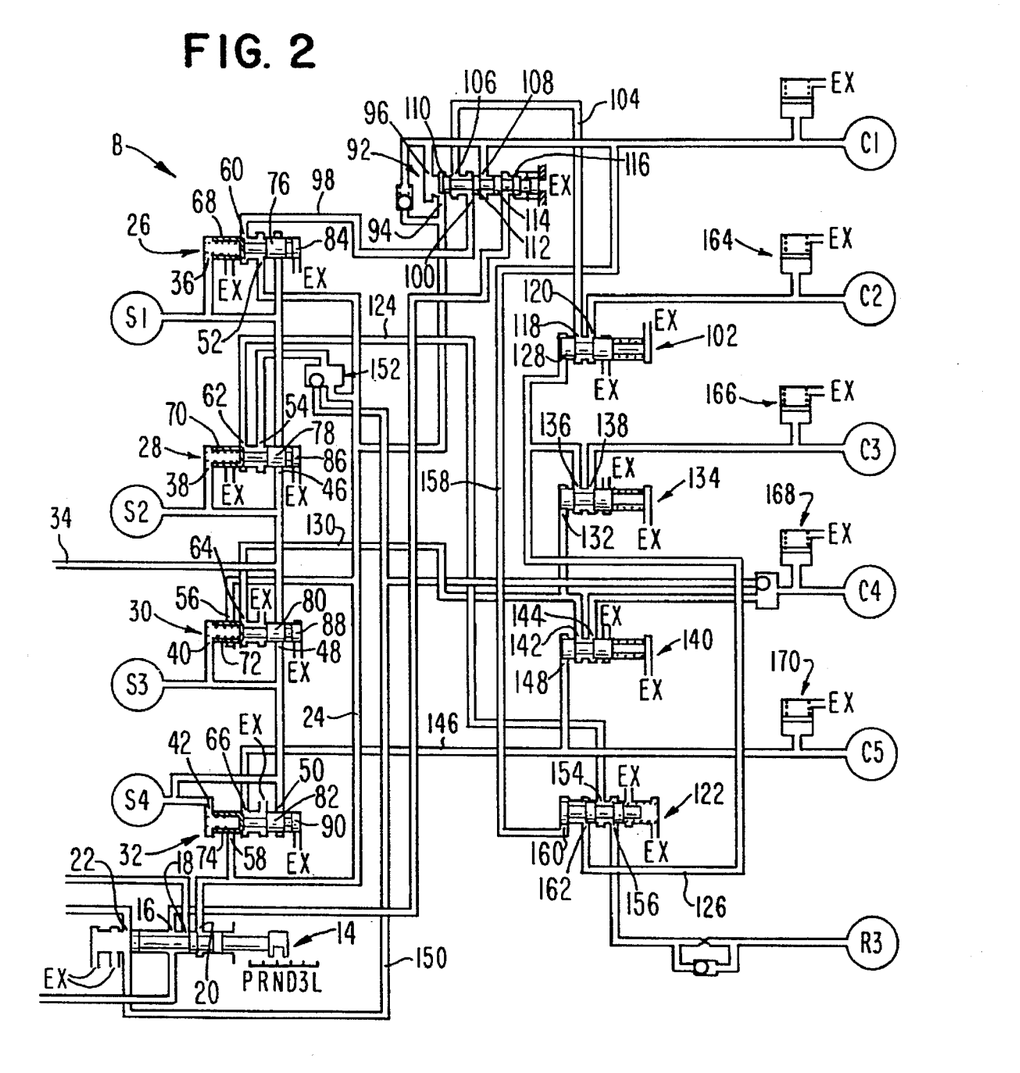
FIG. 2 is a enlarged diagram for illustrating the shift structure of FIG. 1.

Referring to FIG. 1, there are shown an oil pump 2 for pumping an oil by means of the engine power, a regulator valve 4 for regulating the hydraulic pressure produced by the oil pump, a reducing valve 6 for producing a pressure lower than the regulated pressure, a torque converter valve 10 for receiving the pressure from the regulator valve 4 to adjust the pressure of a torque converter 8 and the pressure of the lubrication oil, and a damper clutch control valve 12 for controlling the working presses of the damper clutch installed in the torque converter 8, the construction of which is disclosed in U.S. patent application Ser. No. 08/347,312 filed in the name of the present application.

Although shift control system includes a line pressure regulation part "A" and a shift part "B", the shift part B is only specifically described. The above identified U.S. patent application is referred to concerning the detailed description of the part A. The shift part "B" includes a manual valve 14, which receives the line pressure from the oil pump 2, and makes a port change by means of a shift lever. The manual valve has a first and a second port 16 and 18 for delivering the pressure in the neutral range N, a third port 20 for delivering the pressure in the forward drive range D, a fourth port 22 for delivering the pressure in the reverse drive range R. The second port 18 is connected with a line part to deliver the pressure to the first land of the regulator valve 4, and the fourth port 22 to deliver the pressure to the second land. The third port 20 is connected with a line part 24 to deliver the pressure to the first, second, third and fourth pressure control valves 26, 28, 30 and 32.

The fourth pressure control valves are connected with the hydraulic pressure line so as to move the valve spools by the control pressure supplied from the reducing valve 6 through the line part 34, and control the hydraulic pressure flow by means of normally opened first and second solenoid valves S1 and S2 and normally closed third and fourth solenoid valves S3 and S4 turned on/off by the transmission control unit.

The pressure control valves supplied with the reduced pressure from the reducing valve 6 respectively have a first and a second port 36, 38, 40, 42 and 44, 46, 48, 50, a third port 52, 54, 56, 58 for receiving the pressure of the line part 24, and a fourth port 60, 62, 64, 66 for delivering the pressure of the third port to the shift valves. The valve spools of the pressure control valves have the same structure with a plug 68, 70, 72, 74 resiliently supported by a spring, and a first and second land 76, 78, 80, 82 and 84, 86, 88, 90 integrally formed with the plug.

A portion of the pressure flowing through the line part 24 is designed to be delivered through the N-D control valve 92 directly to the first friction element C1. Such pressure flow is performed through all shift ranges when the manual valve 14 is in the "D" range.

The N-D control valve 92 has a first port 94 for receiving the pressure of the line part 24, a second port 96 for delivering the pressure of the first port to the first friction element C1, a third port 100 for receiving the pressure from the first pressure control valve 26 through a line part 98, a fourth port 106 for delivering the pressure of the third port through a line part 104 to the second-to-third shift valve 102, and a fifth port 108 for receiving the pressure flowing out of the second port 96. The valve spool of the N-D control valve 92 has a first, second and third lands 110, 112 and 114 with a pressure applied surface having the same size, and a fourth land 116 with a pressure applied surface smaller than that of the others.

The second-to-third shift valve 102 has a first port 118 for receiving the pressure through a line part 104, a second port 120 for delivering the pressure of the first port to the second friction element C2, and a third port 128 for receiving the pressure from the second pressure control valve 28 through line parts 124 and 126 by means of the port change of the reverse drive clutch valve 122 controlled by a part of the pressure applied to the first friction element C1.

The third-to-fourth shift valve 134 has a first port 132 for receiving the control pressure from the third pressure control valve 30 through a line part 130, a second port 136 for receiving the pressure of the line part 126 delivering the pressure to the third port 128 of the second-to-third shift valve 102, and a third port 138 for delivering the pressure of the second port to the third friction element C3.

The fourth-to-fifth shift valve 140, which receives through the line part 130 the same pressure as the third-to-fourth shift valve 134, has a first port 142, a second port 144 for delivering the pressure of the first port to the fourth friction element C4, and a third port 148 for receiving the control pressure from the fourth pressure control valve 32 through a line part 146. The fourth friction element C4 is designed to receive directly through a line part 150, which includes a shuttle valve to deliver the pressure to the third port 54 of the second pressure control valve 28. The valve spools of the second-to-third, third-to-fourth and fourth-to-fifth shift valves 102, 134 and 140 has the same conventional structure with two lands and resiliently supported by a spring, and therefore a detailed description thereof is omitted.

The reverse drive clutch valve 122 has a first port 154 for receiving the pressure from the second pressure control valve 28 through the line part 124, a second port 156 for delivering the pressure of the first port to the reverse drive friction element R3, a third port 160 for simultaneously receiving the pressure applied to the first friction element C1, and a fourth port 162 for delivering the pressure of the first port 154 to the second-to-third and third-to-fourth shift valves 102 and 134.

The pressure applied to the friction elements C2, C3, C4, C5 is temporarily accumulated by the accumulators 164, 166, 168, 170 to prevent the abrupt working of the friction elements.

Figure 9:
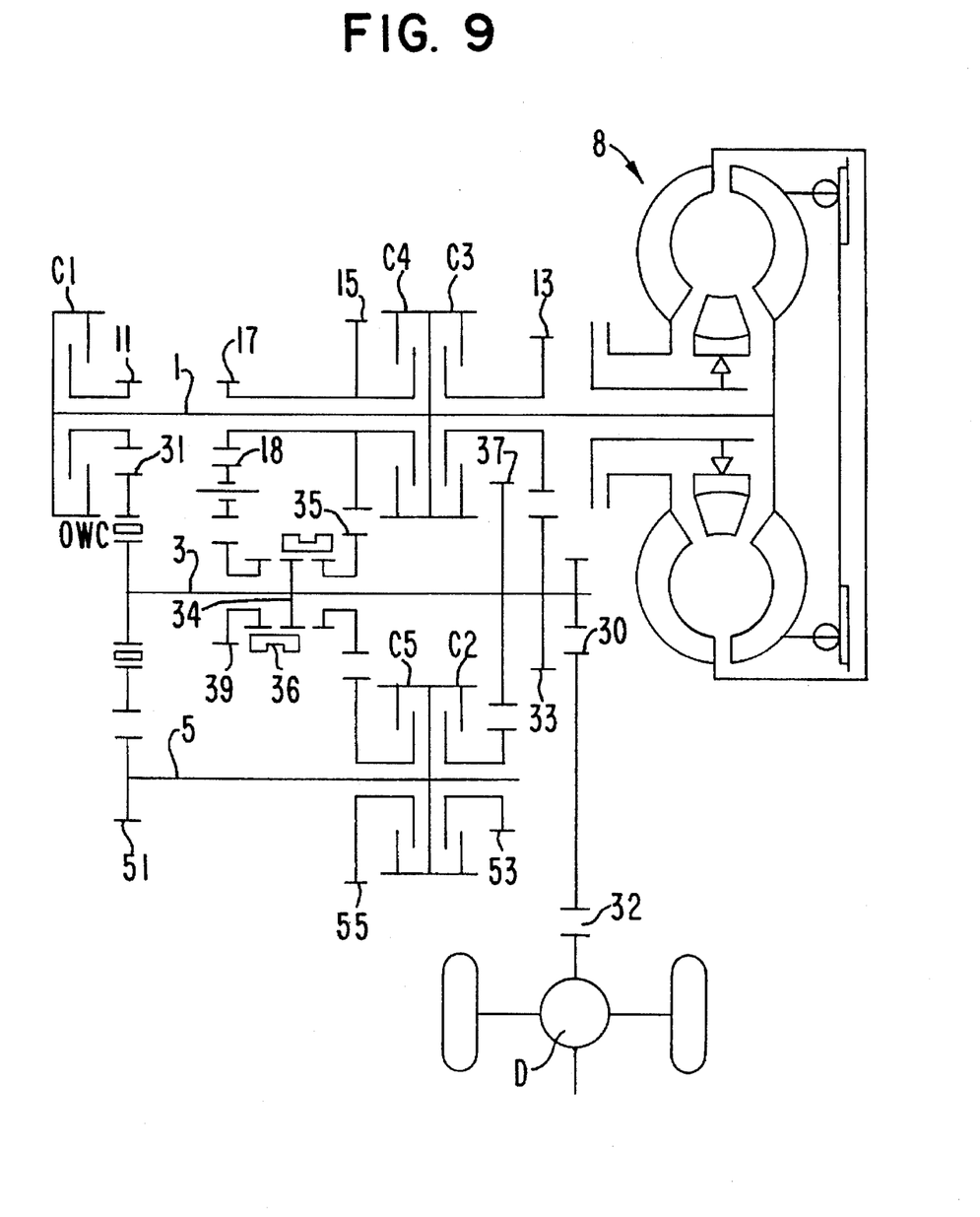
FIG. 9 is a schematic diagram for illustrating a power train to which the shift control system may be applied.

A power train, to which the inventive shift control is applied, is a lay shaft type with three shafts arranged in parallel, which include a main input shaft 1, an auxiliary input shaft 5 and an output shaft 3, as shown in FIG. 9. The main input shaft serves to input the first, third and fourth speeds, and the auxiliary input shaft to input the second and fifth speeds. The main input shaft 1 is connected with the engine (not shown) through the torque converter 8, having a first speed input gear 11, a third speed input gear 13 and a fourth speed input gear 15. The number of the teeth of the third speed input gear 13 is greater than that of the first speed input gear 11, and likewise the fourth speed input gear 15 greater than the third speed input gear 11. Also provided is a reverse drive input gear 17 concentrically between the first and the fourth speed input gear 11 and 15.

The first, third and fourth speed input gears 11, 13 and 15 arranged on the main input shaft 1 are selectively worked respectively by the first speed, third speed and fourth speed/ reverse drive clutches C1, C3 and C4 concentrically arranged with the gears. In addition, the reverse drive input gear 17 is worked by the fourth speed/reverse drive clutch C4 for working the fourth speed input gear 15. Namely, in the present embodiment, the clutch C4 is commonly used with the fourth speed input gear 15 and the reverse drive input gear 17.

The output shaft 3 arranged in parallel with the main input shaft 1 has a first speed output gear 31 engaged with the first speed input gear 11 of the main input shaft 1, a third speed output gear 33 engaged with the third speed input gear 13, a fourth/fifth speed output gear 35 engaged with the fourth speed input gear 15, and a second speed output gear 37. The first speed output gear 31 of the output shaft 3 is Worked by one-way clutch (OWC), and additionally arranged on the output shaft is a reverse drive output gear 39 with the reverse drive input gear 17 and the reverse drive idle gear 18 between the first speed output gear 31 and the fourth/fifth speed output gear 35. A final drive gear 30 is arranged on one end of the output shaft 3 concentrically with the output shafts, driving a final driven gear 32 to produce a finally reduced shift ration applied to a differential gear D. Also arranged on the output shaft 3 is a sleeve 36 to connect the torque of the fourth/fifth output gear 35 or reverse drive output gear 39 with the output shaft.

The auxiliary input shaft 5 arranged in parallel with the output shaft 3 has a transfer gear 51 engaged with the first speed output gear 31 of the output shaft 3 for transferring the torque to the second and fifth input gears, a second speed input gear 53 engaged with the second speed output gear 37 of the output shaft 3, and a fifth speed input gear 55 engaged with the fourth/fifth speed output gear 35 of the output shaft. The second and the fifth speed input gear 53 and 55 are selectively worked by the respective clutches C2 and C5.

Figure 3:
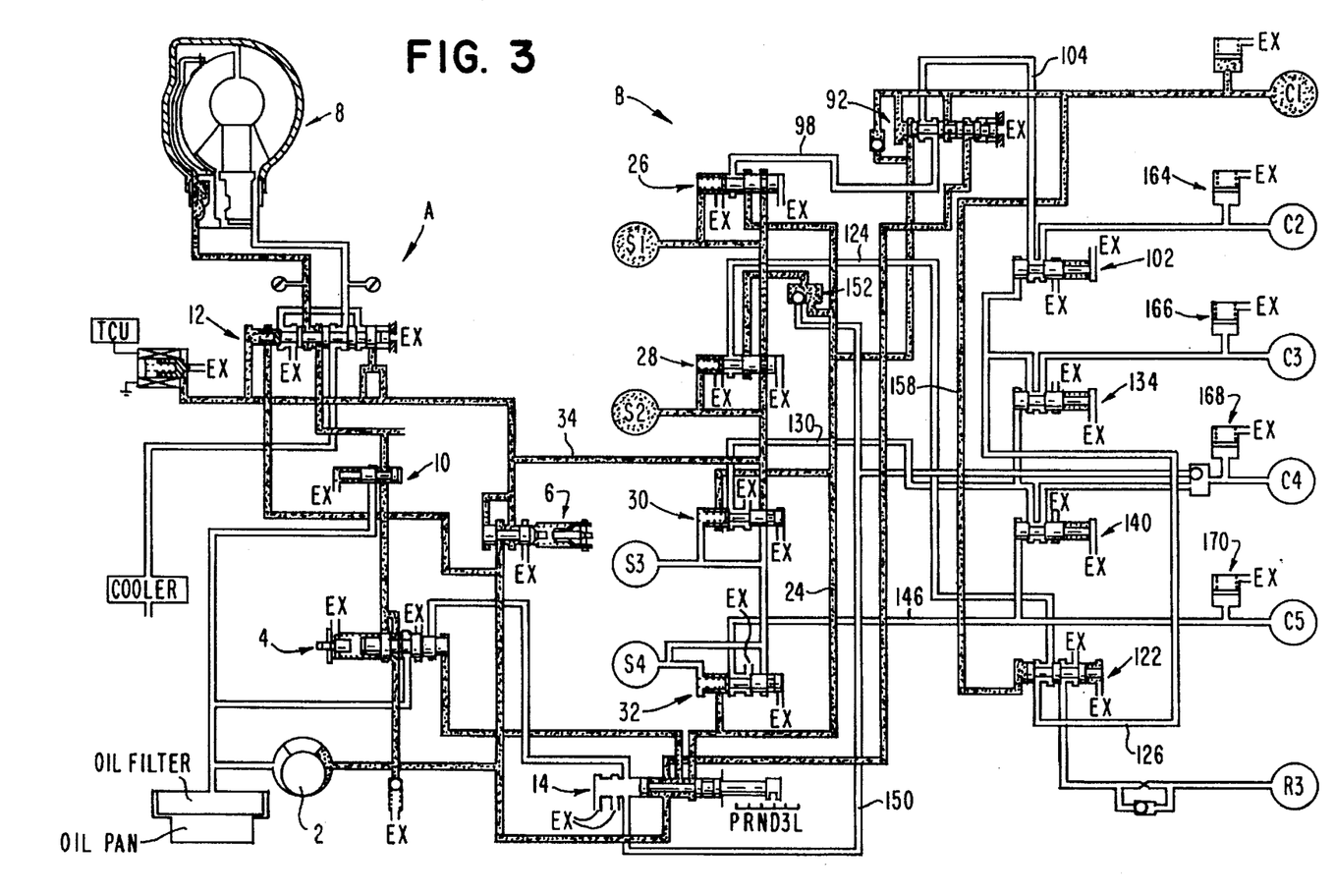
FIG. 3 is a schematic diagram for illustrating the first speed control procedure according to the inventive shift control system.

In operation, the normally opened first and second solenoid valves S1 and S2 are turned on in the first speed of "D" range, so that the working pressure may be applied through the first and second ports 94 and 96 of the N-D control valve 92 to the first friction element C1. In this case, since the first solenoid valve S1 is turned on, the pressure delivered to the third port 52 of the first pressure control valve 26 is maintained blocked. Then, the torque of the torque converter 8 is transferred via the input shaft 1 to the first speed input gear 11 to rotate the first speed output gear 31 and thus the output shaft 3, as shown in FIG. 9.

Figure 4:
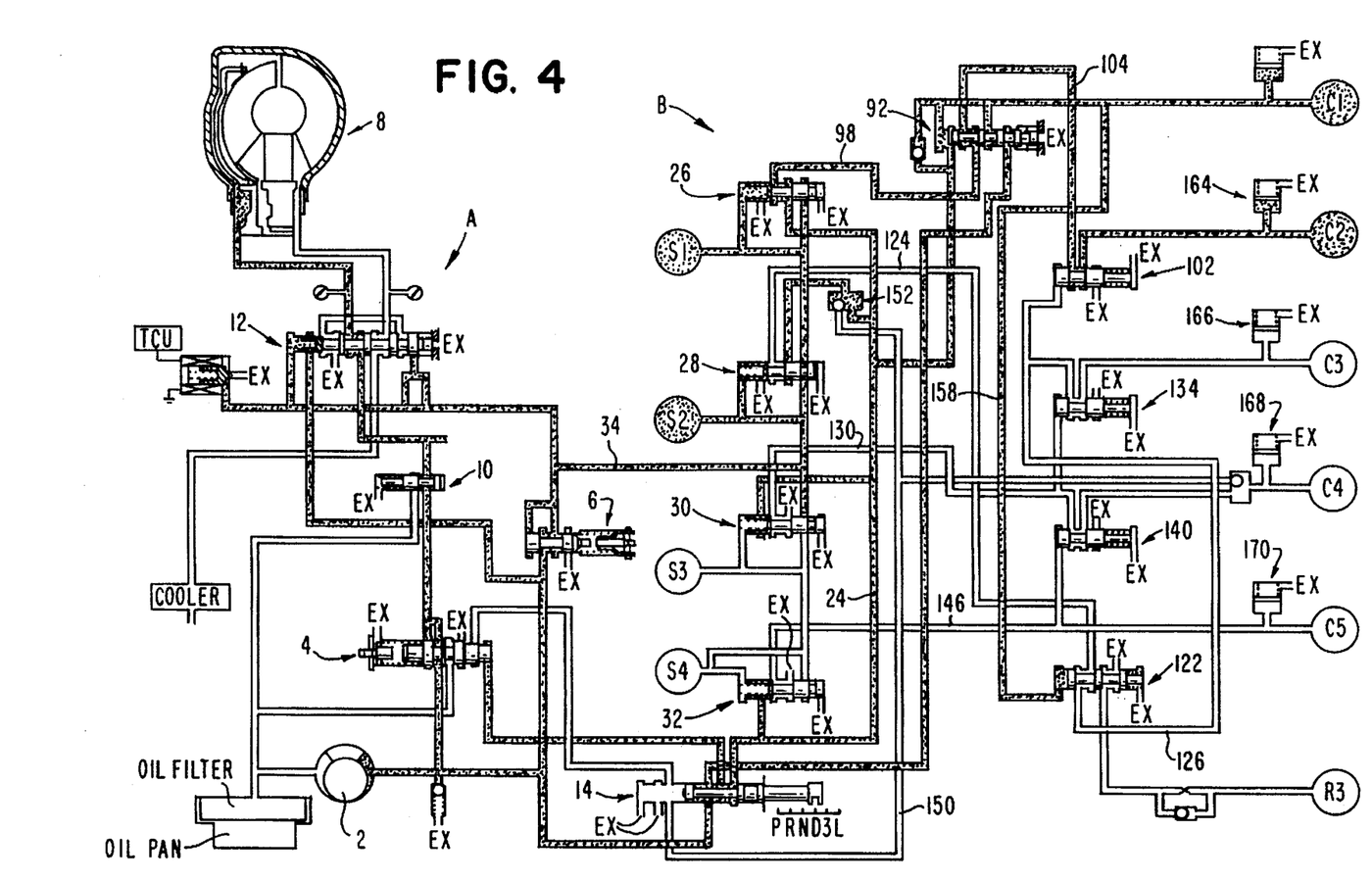
FIG. 4 is a schematic diagram for illustrating the second speed control procedure according to the inventive shift control system.

The vehicle speed being more increased, the transmission control unit turns only the third solenoid valve S2 on and the others off, so that the valve spool of the first pressure control valve 26 is moved to the right side, and the pressure staying in the third port 52 is delivered through the fourth port 60 to a line part 98 to the third port 100 of the N-D control valve 92. Then, the pressure is transferred via a line part 104 to the first port 118 of the second-to-third shift valve 102 because of the third port communicating with the fourth port 106, so that the pressure delivered to the first port is in turn transferred through the second port 120 to the second friction element C2 because of the valve spool moved to the left side by the spring. In this case, a part of the pressure is accumulated by the accumulator 164 to prevent the shock from occurring during the gearshift to the second speed. A part of the pressure applied to the first friction element C1 is delivered through a line part 158 to the third port 162 of the reverse drive clutch valve 122 moving the valve spool to the right side in the same way as in the first speed. The additional working of the second friction element C2 makes the torque of the first speed input gear 11 transferred to the idle gear 51 to the auxiliary shaft 5, whose torque is transferred to the second speed input gear 53 to rotate the second speed output gear 37, as shown in FIG. 9.

Figure 5:
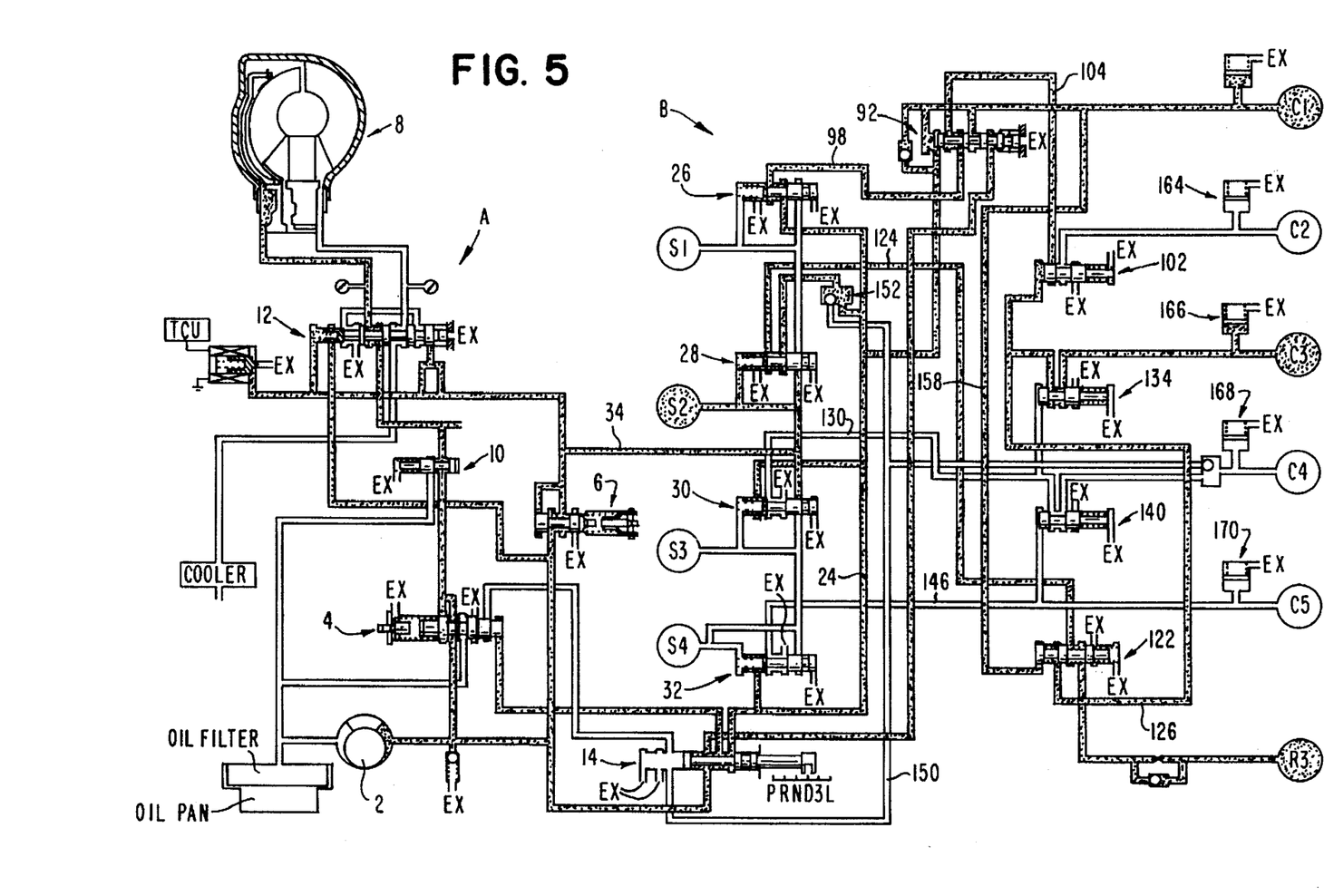
FIG. 5 is a schematic diagram for illustrating the third speed control procedure according to the inventive shift control system.

More increasing the vehicle speed, all the solenoid valves are turned off by the transmission control unit, so that the pressure staying in the third port 54 of the second pressure control valve 28 flows out through the fourth port 62 delivered via a line part 124 to the first port 154 of the reverse drive clutch valve 122. Since the valve spool of the reverse drive clutch valve 122 is presently kept in the right position, the pressure flows from the first port through the fourth port 162 to a line part 126 delivered to the second-to-third shift valve 102 and the third-to-fourth shift valve 134.

The pressure flowing into the third port 128 of the second-to-third shift valve 102 moves the valve spool to the right side to block the pressure applied to the second fraction element C2, while the pressure delivered to the second port 136 of the third-to-fourth shift valve is applied through the accumulator 166 to the third friction element C3 achieving the third speed. Then, the torque of the main shaft 1 is transferred to the third speed input gear 13 rotating the third speed output gear 33.

Figure 6:
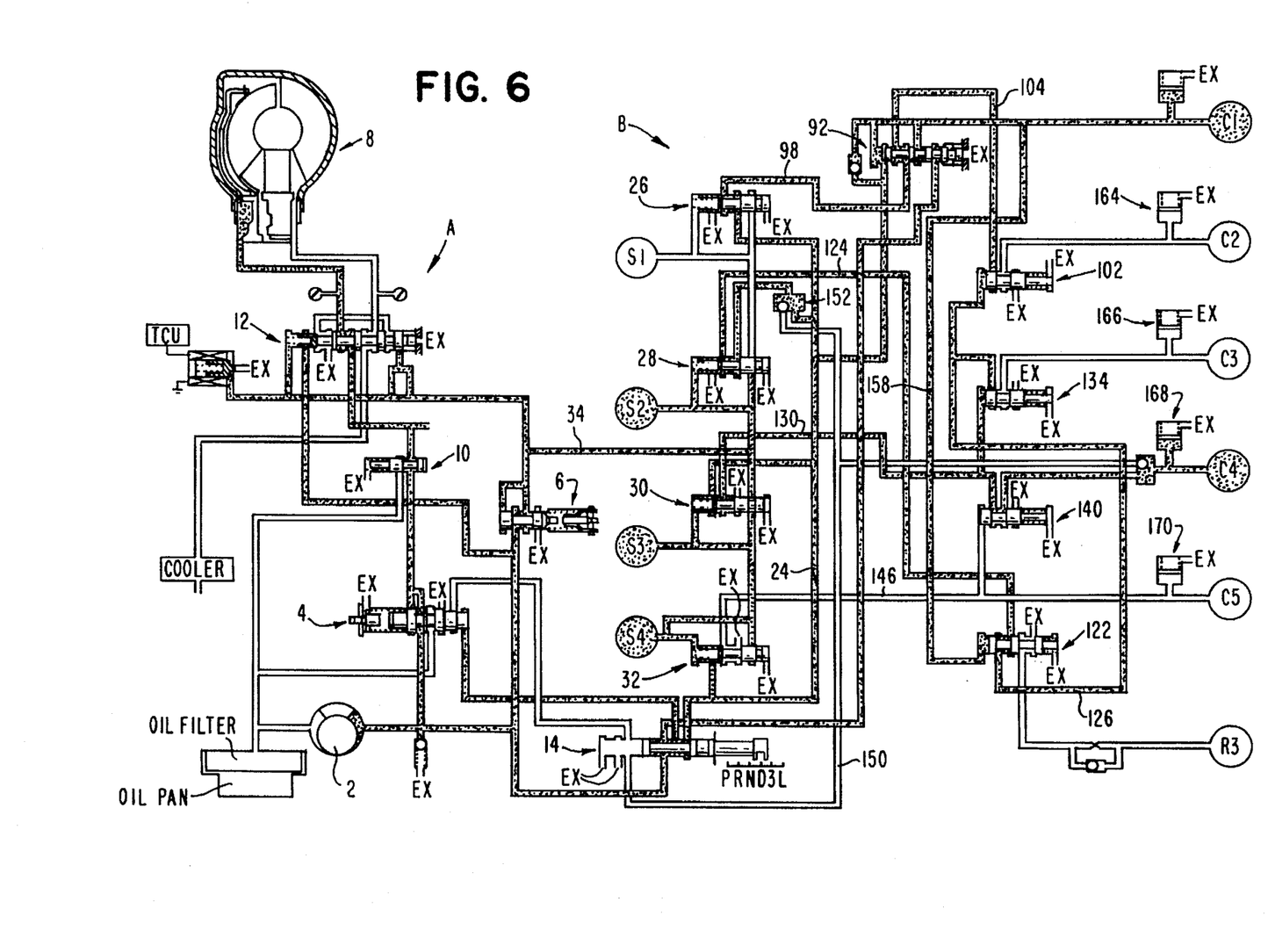
FIG. 6 is a schematic diagram for illustrating the fourth speed control system according to the inventive shift control system.

When the vehicle speed is more increased from the third speed control state, the transmission control unit controls the third solenoid valve S3 on, so that the pressure staying in the third port 56 of the third pressure control valve 30 flows through the fourth port 64 to the line part 130 delivered to the third-to-fourth shift valve 134 and the fourth-to-fifth shift valve 140, as shown in FIG. 6. The pressure delivered tot he third-to-fourth shift valve moves the valve spool to the right side to block the pressure applied to the third friction element C3. The pressure flows from the first port of the fourth-to-fifth shift valve 140 delivered through the second port 144 to the fourth friction element C4 to achieve the fourth speed. Then, the fourth speed input gear 15 receives the torque to rotate the fourth/fifth speed output gear 35.

Figure 7:
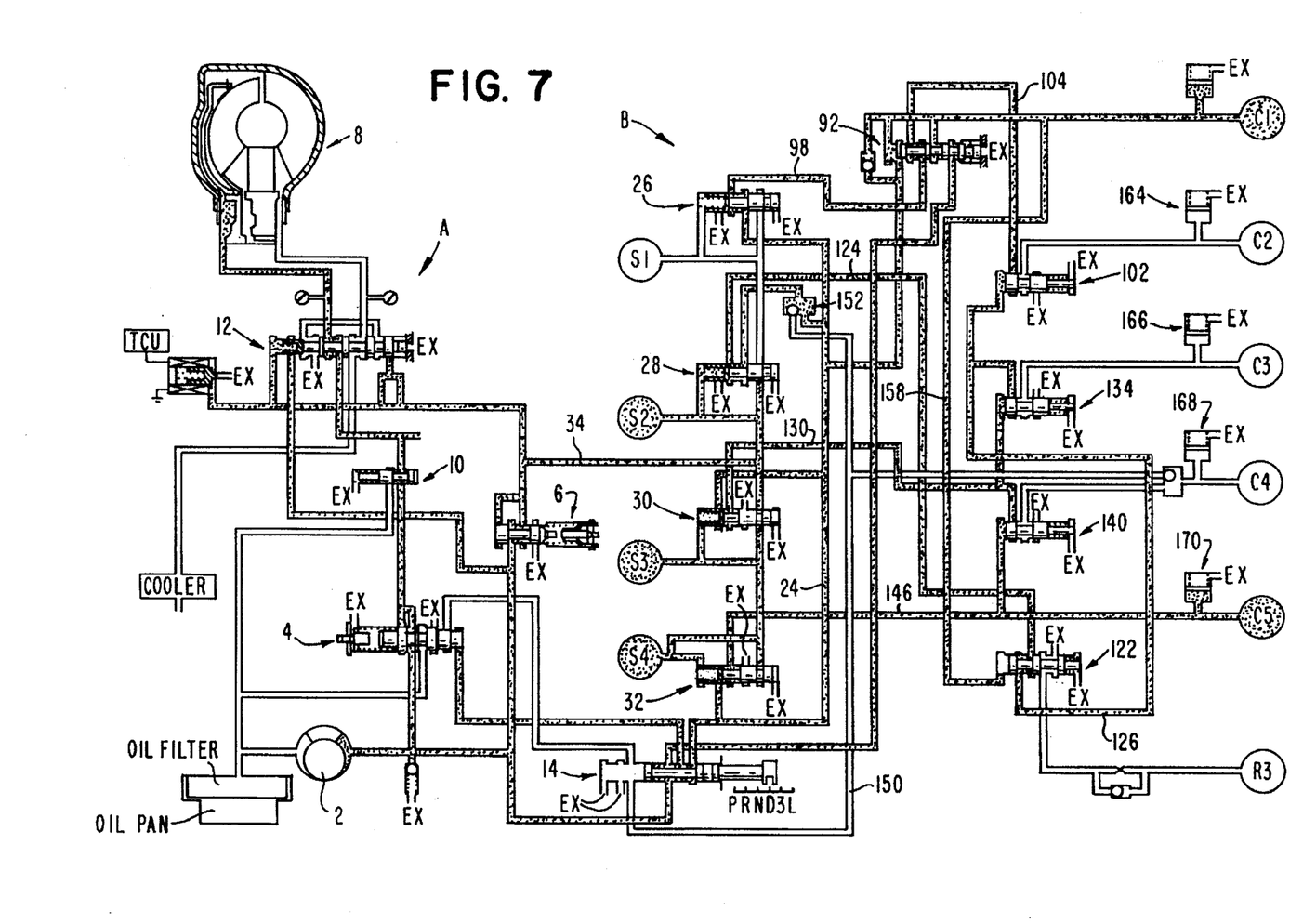
FIG. 7 is a schematic diagram for illustrating the fifth speed control procedure according to the inventive shift control system.

More increasing the vehicle speed from the fourth speed control, the transmission control unit turns the normally opened first and second solenoid valves S1 and S2 off, and the third and fourth solenoid valves S3 and S4 on. Then, the pressure staying in the third port 58 of the fourth pressure control valve 32 flows through the fourth port 66 to the line part 146 to the fourth-to-fifth shift valve 140, as shown in FIG. 7, so that the valve spool is moved to the right side blocking the pressure applied to the fourth friction element C4, while a part of the pressure flowing out from the reverse drive clutch valve 122 through the line part 146 is directly applied to the fifth friction element C5 achieving the gearshift to the fifth speed. Hence, the torque of the main shaft 1 is transferred to the auxiliary input shaft 5 to rotate the fifth speed input gear 55 and thus the fourth/fifth speed output gear 35.

Figure 8:
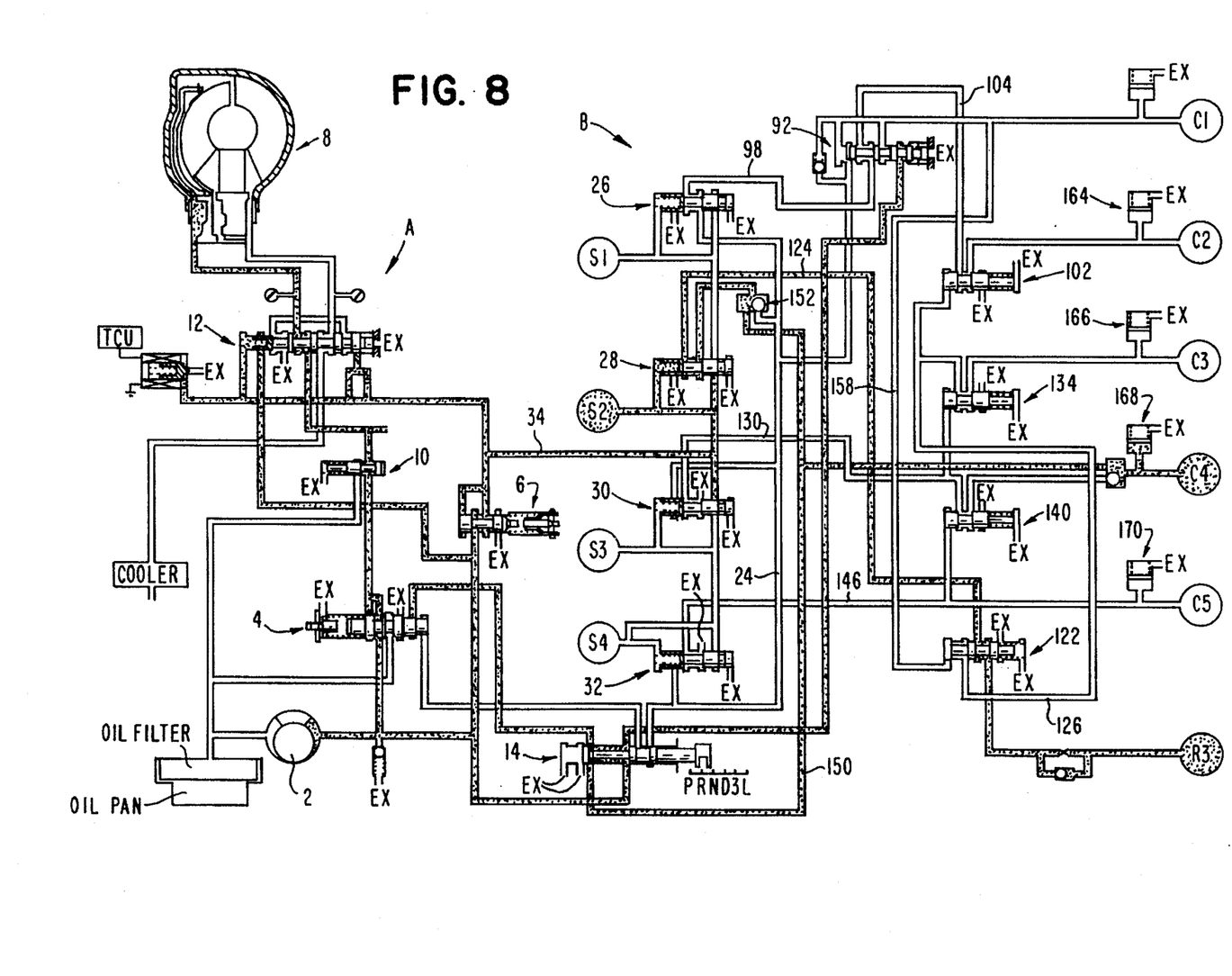
FIG. 8 is a schematic diagram for illustrating the reverse drive control procedure according to the inventive shift control system.

Changing the position of the shift lever to the reverse drive range, the transmission control unit turns the second and third solenoid valves S2 and S3 off, so that the manual valve 14 delivers the pressure through the line part 150 to directly work the fourth friction element C4, as shown in FIG. B, and a portion of the pressure is applied through the third port 54 of the second pressure control valve 28 to the fourth port 62. The pressure flows out from the fourth port through the line part 124 delivered through the first port 154 of the reverse drive clutch valve 122 to the second port 156 to the reverse drive friction element R3, thus completing the reverse drive control.

As described above, the inventive shift control system may control the release and the working side of the clutches, and the shift pressure of the previous shift stage may be released by the working pressure of the present friction element, thus achieving a safe shift control. In addition, the skip shift from the fifth speed to the third speed may be obtained by changing the position of the shift lever from the fifth speed of "D" range to the third range, and the skip shift from the fourth speed to the second speed by changing the shift mode from the fourth speed range to "L" range. Moreover, an accumulator works accompanying each friction element to reduce the shifting shock. In the third speed of "D" range are turned off all the solenoid valves, while the first and second solenoid valves may be a normally opened type to make it possible the third speed running in an emergency mode such as the malfunction of the transmission.

What is claimed is:

1. A shift control system of an automatic transmission used in a vehicle comprising an oil pump, a line pressure regulator for regulating the hydraulic pressure supplied from an oil pump to a hydraulic control line, a reducing valve for forming a pressure lower than the line pressure, a first, a second, a third, and a fourth pressure control valve respectively, each having a first and a second port for receiving a control pressure from the reducing valve, a third port for receiving the line pressure, a fourth port for delivering the line pressure to shift valves, wherein there are provided an N-D control valve, a second-to-third shift valve, a third-to-fourth shift valve, a fourth-to-fifth shift valve, and a reverse drive clutch valve to selectively deliver the pressure from the pressure control valves to a first, a second, a third, a fourth, friction element respectively and a reverse drive friction element.

2. A shift control system as defined in claim 1, wherein said N-D control valve is connected with said second-to-third shift valve so as to work said second friction element, and said second-to-third shift valve is connected with the working pressure line of said third-to-fourth shift valve to work said third friction element, so as to stop the working of said second friction element on working said third friction element.

3. A shift control system as defined in claim 1, wherein said third-to-fourth shift valve communicates with said fourth-to-fifth shift valve for delivering the working pressure to work said fourth friction element, thereby being controlled by said working pressure.

4. A shift control system as defined in claim 1, wherein said second to fifth friction elements are accompanied by an accumulator, applied with the working pressure.

5. A shift control system as defined in claim 1, wherein said reverse drive clutch valve has a first port for receiving the line pressure, a second port for delivering said line pressure to said reverse drive friction element, a third port for delivering said line pressure as the release pressure of said second friction element and the working pressure of said third friction element, and a fourth port for receiving the working pressure of said first friction element to control a valve spool.

* * * * *

UNITED STATES PATENT AND TRADEMARK OFFICE
CERTIFICATE OF CORRECTION

PATENT NO. : 5,651,751
DATED : July 29, 1997
INVENTOR(S) : Jaeduk JANG

It is certified that error appears in the above-indentified patent and that said Letters Patent is hereby corrected as shown below:

Claim 1, column 6, line 38, before "friction" insert --a fifth--.

Signed and Sealed this

Twenty-third Day of September, 1997

Attest:

BRUCE LEHMAN

Attesting Officer

Commissioner of Patents and Trademarks